(12) United States Patent
Fresu

(10) Patent No.: US 11,725,740 B2
(45) Date of Patent: Aug. 15, 2023

(54) VALVE WITH MOVABLE SHUTTER

(71) Applicant: PETROLVALVES S.P.A., Milan (IT)

(72) Inventor: Sebastiano Fresu, San Casciano in Val di Pesa (IT)

(73) Assignee: PETROLVALVES S.P.A., Milan (IT)

( * ) Notice: Subject to any disclaimer, the term of this patent is extended or adjusted under 35 U.S.C. 154(b) by 0 days.

(21) Appl. No.: 17/757,155

(22) PCT Filed: Nov. 30, 2020

(86) PCT No.: PCT/IB2020/061280
§ 371 (c)(1),
(2) Date: Jun. 10, 2022

(87) PCT Pub. No.: WO2021/123980
PCT Pub. Date: Jun. 24, 2021

(65) Prior Publication Data
US 2022/0356952 A1 Nov. 10, 2022

(30) Foreign Application Priority Data
Dec. 16, 2019 (IT) .......................... 102019000024129

(51) Int. Cl.
*F16K 5/06* (2006.01)
*F16K 27/06* (2006.01)
(Continued)

(52) U.S. Cl.
CPC .......... *F16K 5/0631* (2013.01); *F16K 5/0626* (2013.01); *F16K 27/067* (2013.01);
(Continued)

(58) Field of Classification Search
CPC .... F16K 5/0631; F16K 5/0626; F16K 27/067; F16L 21/02; F16L 21/08; F16L 29/002
(Continued)

(56) References Cited

U.S. PATENT DOCUMENTS 1,016,620 A 2/1912 Gapp
3,544,137 A * 12/1970 Contreras ............... F16L 27/04
285/261

(Continued)

FOREIGN PATENT DOCUMENTS

EP 0378520 A1 7/1990
KR 101816771 B1 1/2018

OTHER PUBLICATIONS

International Search Report and Written Opinion for Corresponding International Application No. PCT/IB2020/061280, 15 pages, dated Mar. 5, 2021.

*Primary Examiner* — John Bastianelli
(74) *Attorney, Agent, or Firm* — Lucas & Mercanti, LLP

(57) ABSTRACT

A valve having a hollow body which extends along a main axis (X), in which at least one secondary body is arranged at one end of the hollow body substantially coaxial to the main axis (X) and has an inner end portion with a collar protruding towards the inner surface of the hollow body is disclosed. The hollow body has at least one annular groove in which a ring is arranged at least partially to prevent the movement of the secondary body towards the end of the hollow body, in which the ring is divided into at least two arcs configured to be inserted individually inside the groove of the hollow body to form the ring.

14 Claims, 8 Drawing Sheets

(51) Int. Cl.
*F16L 29/00* (2006.01)
*F16L 21/02* (2006.01)
*F16L 21/08* (2006.01)

(52) U.S. Cl.
CPC ............... *F16L 21/02* (2013.01); *F16L 21/08* (2013.01); *F16L 29/002* (2013.01)

(58) Field of Classification Search
USPC .................................................. 251/152, 148
See application file for complete search history.

(56) References Cited

U.S. PATENT DOCUMENTS

| | | | | |
|---|---|---|---|---|
| 3,724,878 | A * | 4/1973 | Ford | F16L 27/1017 285/94 |
| 4,052,091 | A | 10/1977 | Bowden | |
| 4,103,866 | A * | 8/1978 | Robinson | F16K 27/0218 251/151 |
| 4,676,479 | A | 6/1987 | Ogawa et al. | |
| 2011/0049408 | A1 | 3/2011 | Gutmann et al. | |
| 2014/0132000 | A1* | 5/2014 | Ben-Horin | F16K 27/0218 285/373 |

* cited by examiner

VALVE WITH MOVABLE SHUTTER

CROSS-REFERENCE TO RELATED APPLICATIONS

This application is a 371 of PCT/IB2020/061280, filed Nov. 30, 2020, which claims the benefit of Italian Patent Application No. 102019000024129, filed Dec. 16, 2019.

TECHNICAL FIELD

The present description relates to a valve, in particular to a valve with a movable obturator arranged in a valve body.

BACKGROUND OF THE DESCRIPTION

Known valves include flanges arranged at the ends of a hollow body in which the shutter moves. Said flanges can be made in a single piece with the hollow body, with relatively high costs. To reduce these costs, secondary bodies provided with a flange can be fixed to the hollow body, which thus has a simpler shape, for example substantially cylindrical. Said fixing must withstand the stresses of the ducts between which the valve is fixed, so that the secondary bodies are fixed to the hollow body by means of a relatively high number of axial screws, with consequent relatively long assembly times. To reduce costs, a flange for the shutter control stem is also fixed to the hollow body by means of a plurality of axial screws, again with consequent relatively long assembly times.

SUMMARY OF DESCRIPTION

An objective of the present description is to provide a valve free from such drawbacks. Said objective is achieved with a valve whose main characteristics are specified in the attached claims.

Thanks to a particular ring split in arcs, at least one secondary body provided with a flange can be fixed to a hollow body of the valve in a fast and robust fashion.

The cross-section and adjacent surfaces of such arcs may have particular profiles and shapes which allow shape couplings to improve valve strength.

Special stops can be placed between the hollow body and the secondary body, again to improve the robustness of the valve.

Furthermore, radial holes can be made in the hollow body to permanently or temporarily fix the arcs of the ring and/or the internal terminal portion of the secondary body.

The flange for the shutter control stem is fixed to the hollow body by means of a particular threaded ring or by means of a shaped coupling, in particular a bayonet.

The flange for the control stem of the shutter can also be made in one piece with the secondary body, in which case the hollow body of the valve is the sleeve which includes the control stem and which is fixed to a main body of the valve in which the shutter moves.

BRIEF DESCRIPTION OF THE DRAWINGS

Further advantages and characteristics of the valve according to the present description will become evident to those skilled in the art from the following detailed and non-limiting description of some of its embodiments with reference to the attached drawings in which.

EXEMPLARY EMBODIMENTS

Figure 1:
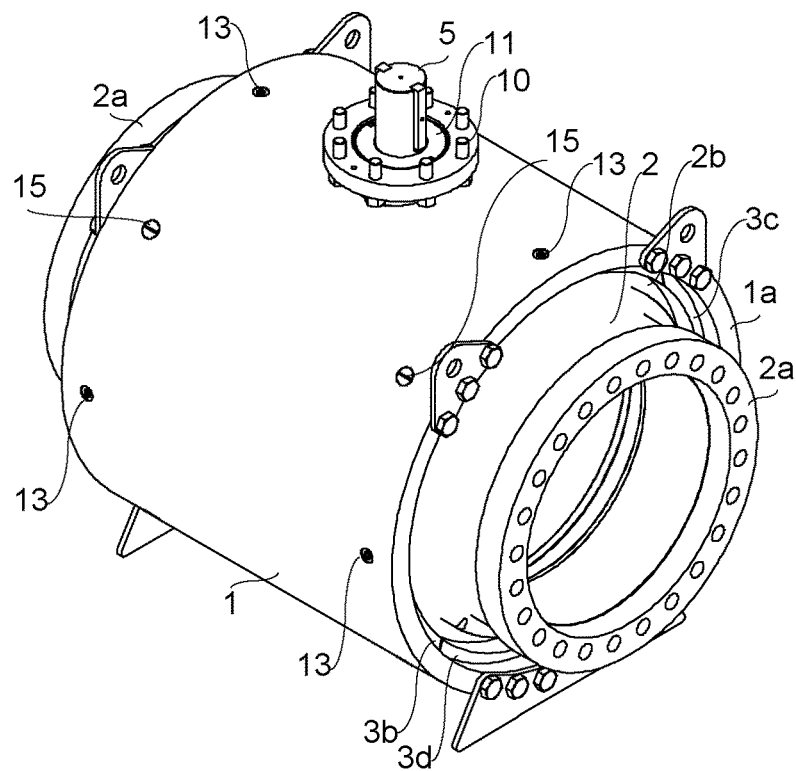
FIG. 1 shows an isometric view of the first embodiment of the valve.
Figure 2:
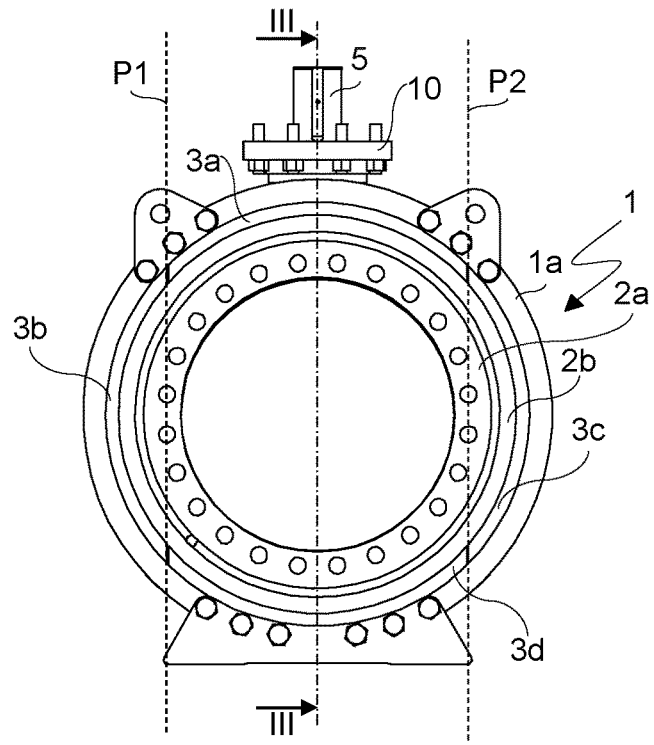
FIG. 2 shows a front view of the valve of FIG. 1.
Figure 3:
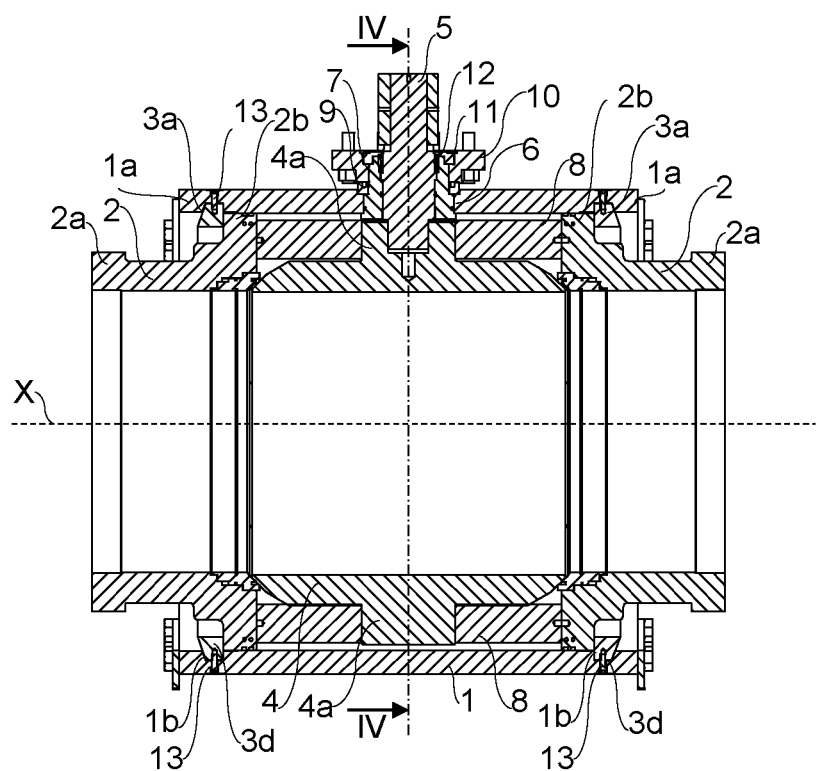
FIG. 3 shows the section of FIG. 2.
Figure 4:
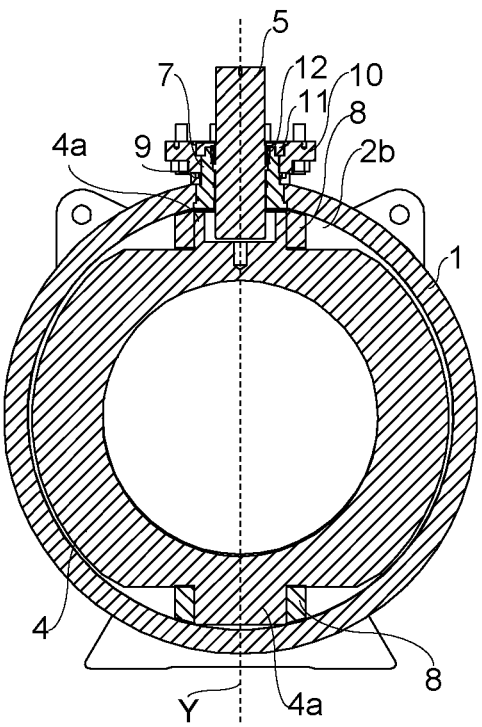
FIG. 4 shows the section IV-IV of FIG. 3.
Figure 5:
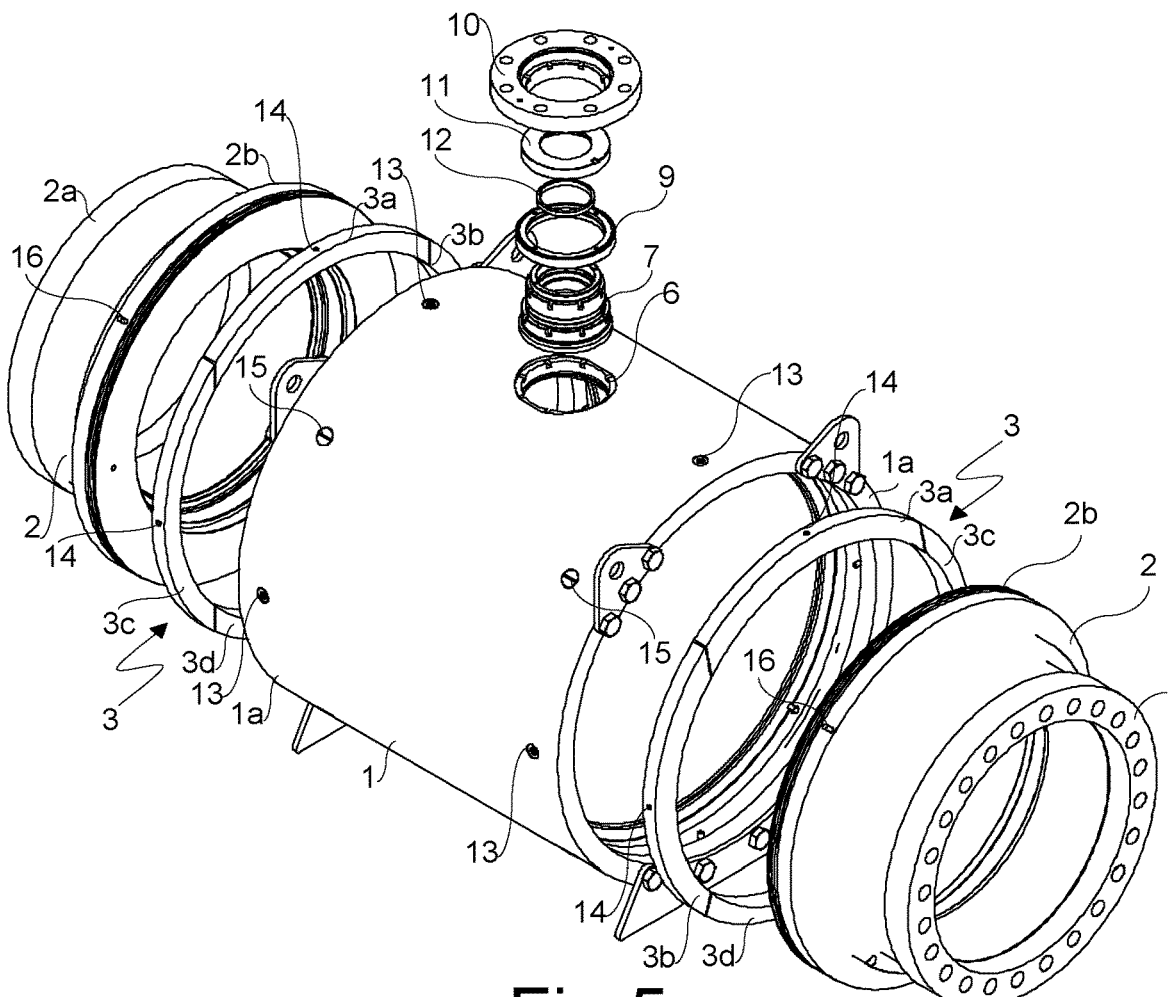
FIG. 5 shows an exploded partial view of the valve of FIG. 1.
Figure 6:
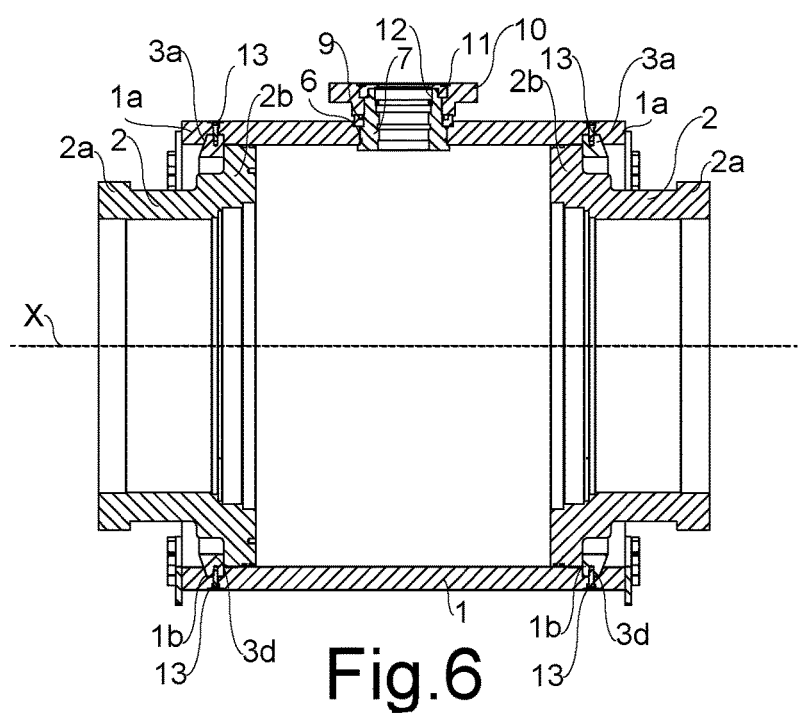
FIG. 6 shows a view in longitudinal section of the valve of FIG. 5.

Referring to the figures from 1 to 6, the valve according to the present disclosure includes a hollow body 1, in particular having a substantially cylindrical tubular shape, which extends along a main axis X which identifies the direction of the fluid flowing throughout the valve between the inlet and outlet ends. In particular, the main axis X is the longitudinal axis of the hollow body 1.

The present valve also comprises at least one secondary body 2 arranged at an end 1$a$ of the hollow body 1 which is provided with a substantially circular opening, for example an inlet opening for the valve. The secondary body 2 presents in particular a substantially cylindrical tubular shape and is configured to connect to pipes or machinery (not shown in the figures) by means of an external flange 2$a$. In particular, the secondary body 2 is disposed in the hollow body 1 in a substantially coaxial manner with the main axis X and/or includes an internal terminal portion 2$b$ configured to be disposed in the hollow body 1. The internal terminal portion 2$b$ of the secondary body 2 comprises a collar which protrudes towards the internal surface of the hollow body 1 and is provided with gaskets (not shown in the figures) to create a perimeter hermetic seal between the internal wall of the hollow body 1 and the internal end portion 2$b$ of the secondary body 2.

The hollow body 1 also comprises an annular groove 1$b$ which is formed in the internal surface of the hollow body 1 and which preferably has a cross section with a substantially right trapezoid shape, with the bases parallel to the main axis X, the major base facing towards the main axis X and the oblique side towards the end 1$a$ of the hollow body 1.

The valve comprises also a ring 3 configured to be inserted partially within the annular groove 1$b$ to form a shoulder that goes in contact with the inner end portion 2$b$ of the secondary body 2 for preventing the movement of the secondary body 2 towards the end 1$a$ of the hollow body 1.

The cross-section of a portion of the ring 3 preferably has a substantially right trapezoid shape, with the bases parallel to the main axis X, the major base facing the main axis X and the oblique side facing the end 1*a* of the hollow body 1, so that a peripheral portion of the ring 3 has substantially the same profile and substantially the same dimensions as the annular groove 1*b*.

The ring 3 is divided into at least two arcs configured to be inserted individually inside the groove 1*b* of the hollow body 1 to form the ring 3. In particular, the ring 3 is divided into at least four arcs 3*a*, 3*b*, 3*c* and 3*d*, each of which cover preferably an angle of 60°-180°, in particular 80°-100°. The adjacent surfaces of two adjacent arcs are preferably flat and parallel to the main axis X. In the present embodiment, the adjacent surfaces of two pairs of adjacent arcs 3*a*, 3*b* and 3*b*, 3*d* lie on the same plane P1 parallel to the main axis X and/or parallel to a plane P2 on which the adjacent surfaces of two other pairs of adjacent arcs 3*a*, 3*c* and 3*c*, 3*d* lie.

The valve also comprises a shutter 4 which can move in the hollow body 1 along and/or around an axis, in particular rotate around an axis of rotation Y, substantially perpendicular to the main axis X through a control stem 5 which crosses a radial opening 6 obtained in the hollow body 1. The radial opening 6 is provided with a sleeve 7 in which the control stem 5 is arranged. One or more spacers 8 are arranged in the hollow body 1 between the shutter 4 and the secondary body 2 in order to prevent that the secondary body 2 can move along the main axis X towards the interior of the hollow body 1. In particular, the hollow body 1 comprises two spacers 8 having substantially form of a parallelepiped, which are provided with a circular opening in which a portion 4*a* of the shutter 4 is arranged which has a substantially cylindrical shape and protrudes axially from the shutter 4, so that the shutter 4 can rotate between the two spacers 8. Alternatively or in addition to the spacers 8, the internal surface of the hollow body 1 can comprise one or more protrusions acting as a stop for the secondary body 2.

The sleeve 7 has a collar disposed in the hollow body 1 and acting as a shoulder to prevent the sleeve 7 from escaping from the radial opening 6. The sleeve 7 is provided with a first external thread on which it is screwed a first threaded ring 9 that locks the sleeve 7 in the radial opening 6. A flange 10 is arranged around the sleeve 7 and is locked thereon by means of a second threaded ring 11 screwed onto a second external thread of the sleeve 7. One or more gaskets 12 can be arranged between the sleeve 7 and the control rod 5, in particular between the sleeve 7 and the second threaded ring 11.

The hollow body 1 can be provided with one or more radial holes 13 for screws which can be screwed into at least one threaded hole 14 obtained in the ring 3, in particular threaded holes 14 obtained in the arcs 3*a*, 3*b*, 3*c* and/or 3*d*.

The hollow body 1 can be provided with one or more radial holes 15 for screws which can be screwed into at least one threaded hole 16 obtained in the internal terminal portion 2*b* of the secondary body 2.

Figure 7:
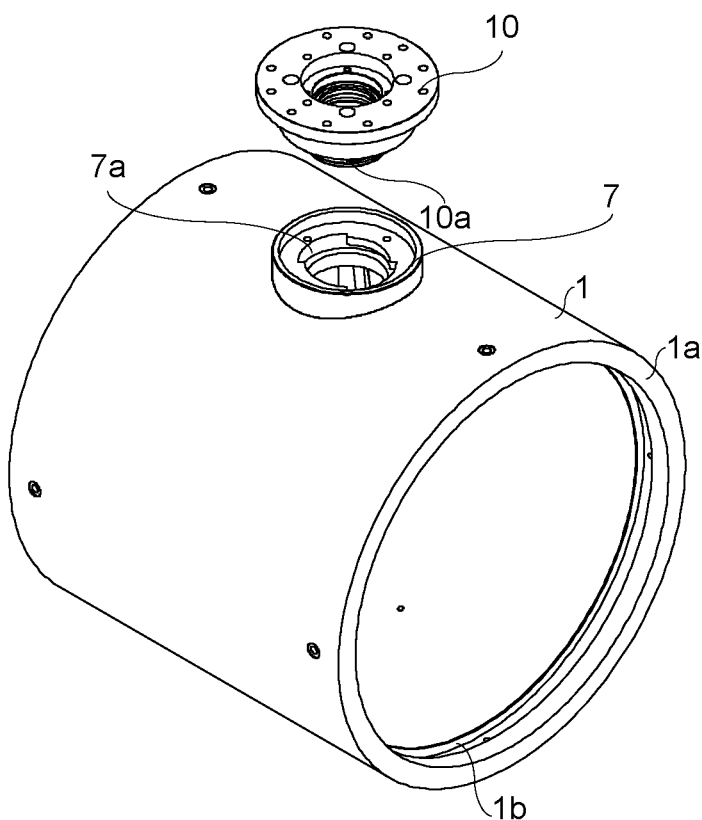
FIG. 7 shows an exploded partial view of the second embodiment of the valve.
Figure 8:
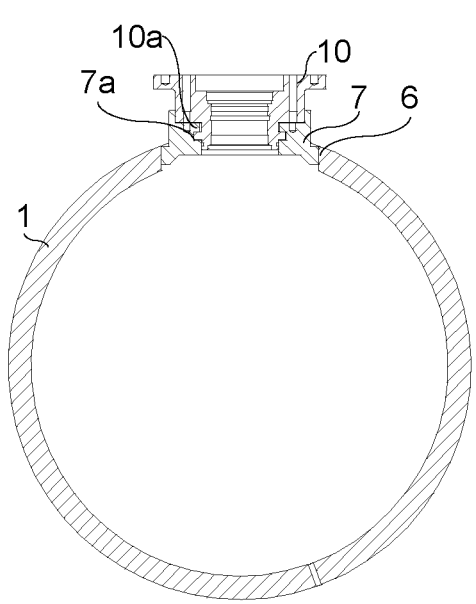
FIG. 8 shows a cross-sectional view of the valve of FIG. 7.
Figure 9:
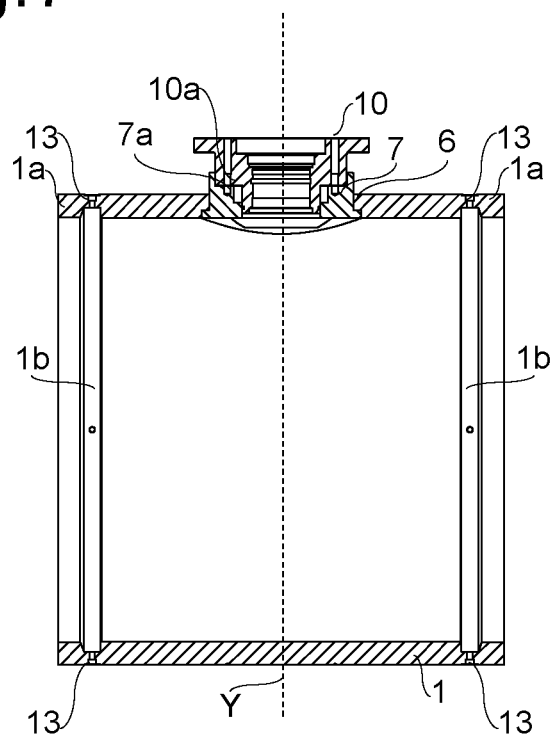
FIG. 9 shows a view in longitudinal section of the valve of FIG. 7.
Figure 10:
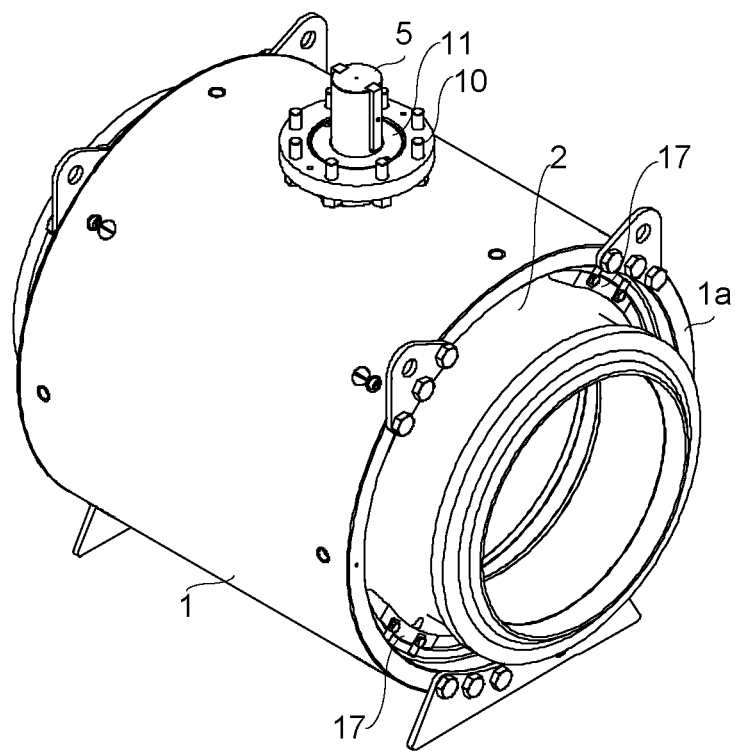
FIG. 10 shows an axonometric view of the third embodiment of the valve.
Figure 11:
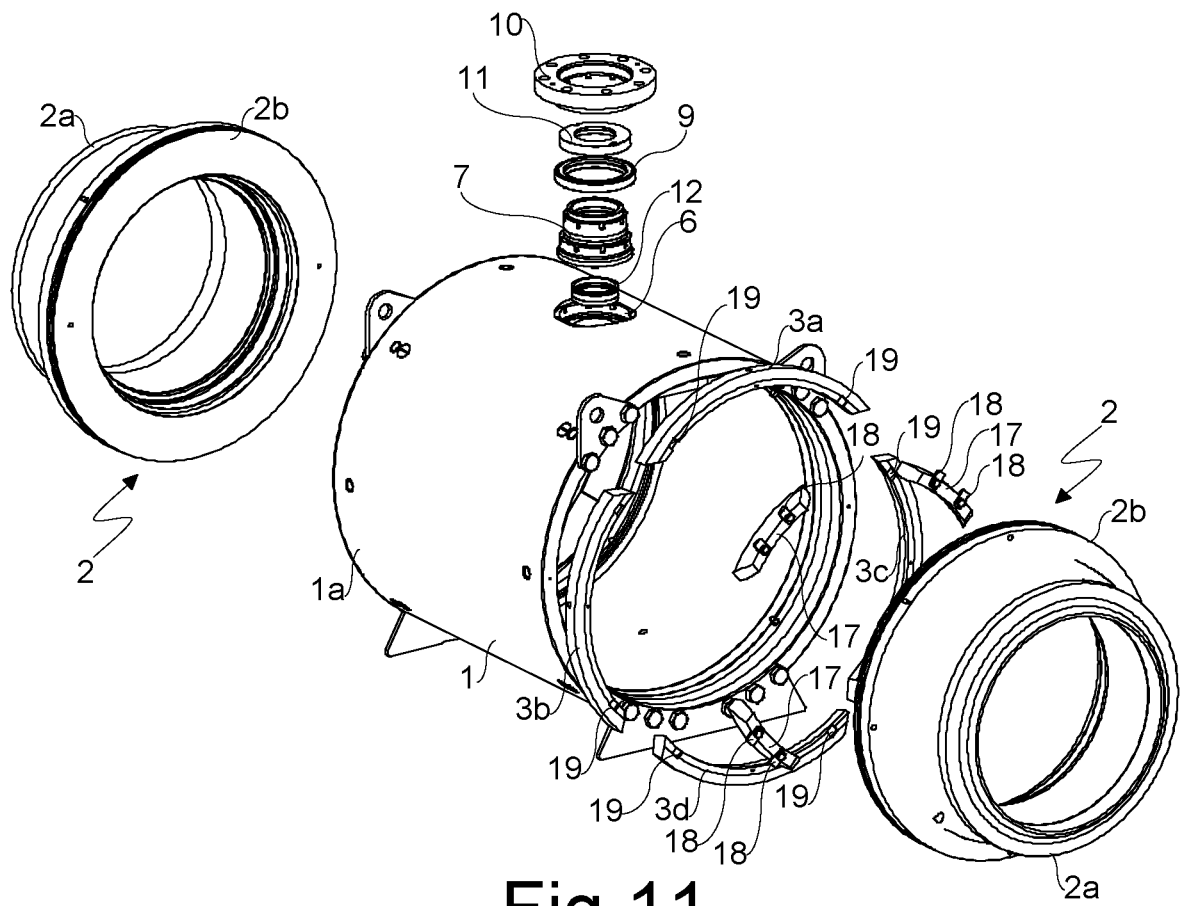
FIG. 11 shows an exploded view of part of the valve of FIG. 10.
Figure 12:
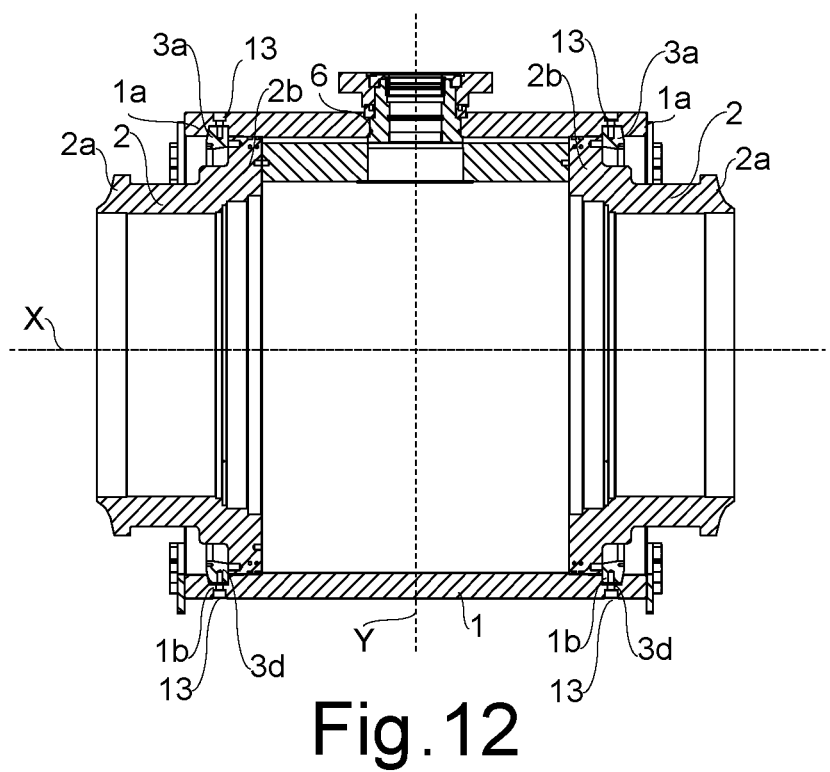
FIG. 12 shows a longitudinal section of the valve of FIG. 11.
Figure 13:
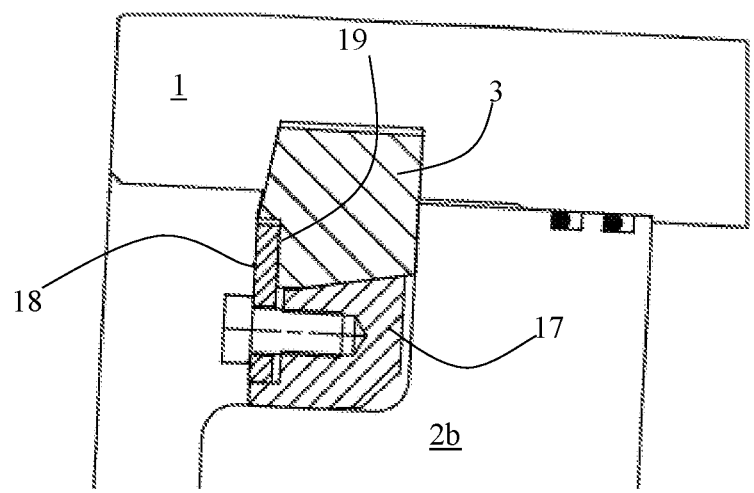
FIG. 13 is a detail view in section showing a stop of the plurality of stops which locks two adjacent ring portions.

With reference to FIGS. 7 to 9, it can be seen that in a second embodiment of the valve, similar to the first embodiment, the sleeve 7 is welded in the radial opening 6 obtained in the hollow body 1 and is provided with a seat 7*a* shaped for a shape coupling, in particular a snap fit coupling, to be coupled with a corresponding shaped portion 10*a* obtained in the flange 10, so that the flange 10 can be fixed to the hollow body 1 with a rotation of less than 360° around the Y axis of rotation.

With reference to FIGS. 10 to 13, it can be seen that in a third embodiment of the valve, similar to the first embodiment, one or more stops 17 are arranged in the hollow body 1 around the secondary body 2 to lock the ring 3. In in particular, the stops 17 have an arched shape in order to be arranged astride two adjacent arcs, for example 3*a* and 3*b*, of the arcs 3*a*, 3*b*, 3*c* and/or 3*d*. The stops 17 can comprise at least two tongues 18 adapted to be arranged in as many seats 19 made near the adjacent surfaces of two adjacent arcs, for example 3*a* and 3*b*, of the arcs 3*a*, 3*b*, 3*c* and/or 3*d*. The tongues 18 can be fixed to the stops 17 by means of screws screwed into axial holes made in the stops 17. The adjacent surfaces of two pairs of adjacent arcs 3*a*, 3*b* and 3*a*, 3*c* lie on a plane substantially perpendicular to two planes parallel to each other, on which lie the adjacent surfaces of two other pairs of adjacent arcs 3*b*, 3*d* and 3*c*, 3*d*. The stops 17 preferably have a cross section with a substantially right trapezoid shape, with the bases perpendicular to the main axis X, the minor base facing the end 1*a* of the hollow body 1 and the oblique side facing the ring 3, which comprises an oblique side facing the stops 17, so that the ring 3 and the stops 17 form a shape coupling that prevents the stops 17 from moving towards the end 1*a* of the hollow body 1.

In use, the secondary body 2 is inserted into the hollow body 1 through the opening of the end 1*a* until it comes into contact with the spacers 8, then the arcs 3*a*, 3*b*, 3*c*, 3*d* are inserted into the annular groove 1*b* to form the ring 3. Each arch 3*a*, 3*b*, 3*c*, 3*d* is fixed in the annular groove 1*b* by means of the screw screwed into the respective threaded hole 14 before the next arch is inserted. Before the last arch, for example the arc 3*d*, is inserted into the annular groove 1*b*, the stops 7 are arranged around the secondary body 2 and made to rotate about the main axis X. When the last arch is also inserted in the annular groove 1*b*, the stops 17 are made to rotate further around the main axis X in the position over two adjacent arcs and fixed to the latter by means of the tongues 18.

Preferably, the above-mentioned embodiments of the valve comprise two secondary bodies 2 which are substantially equal to each other, which are arranged at two ends 1*a* of the hollow body 1, which are substantially coaxial to the main axis X and are blocked by rings 3 which are divided into two or more arcs 3*a*, 3*b*, 3*c*, 3*d* and are arranged in annular grooves 1*b* obtained in the hollow body 1.

Figure 14:
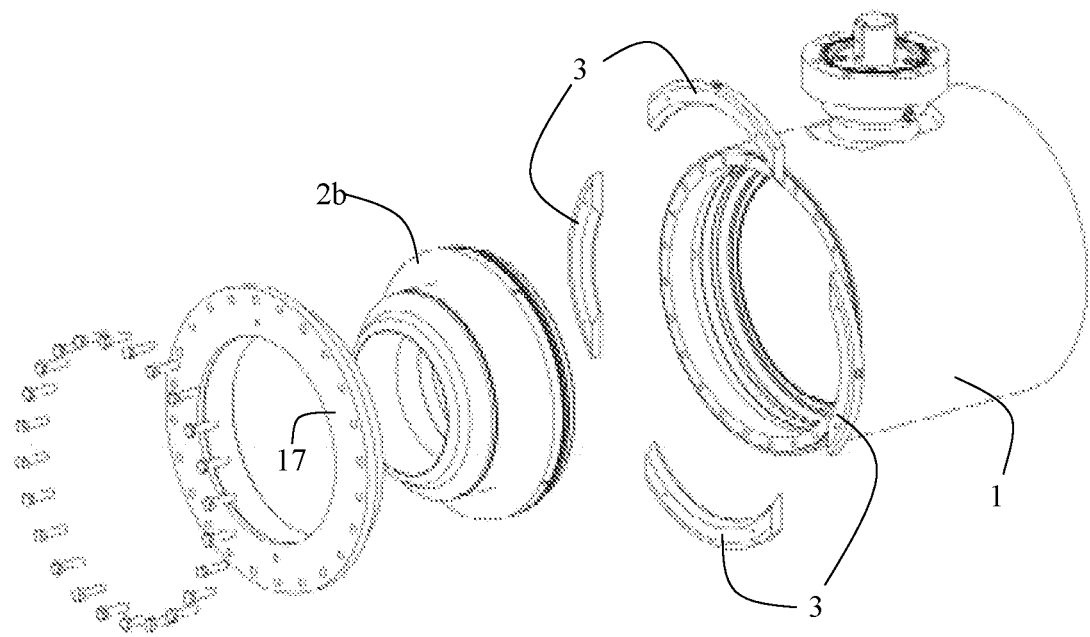
FIG. 14 shows an alternative embodiment in which there is a single stop that simultaneously blocks all the ring portions.
Figure 15:
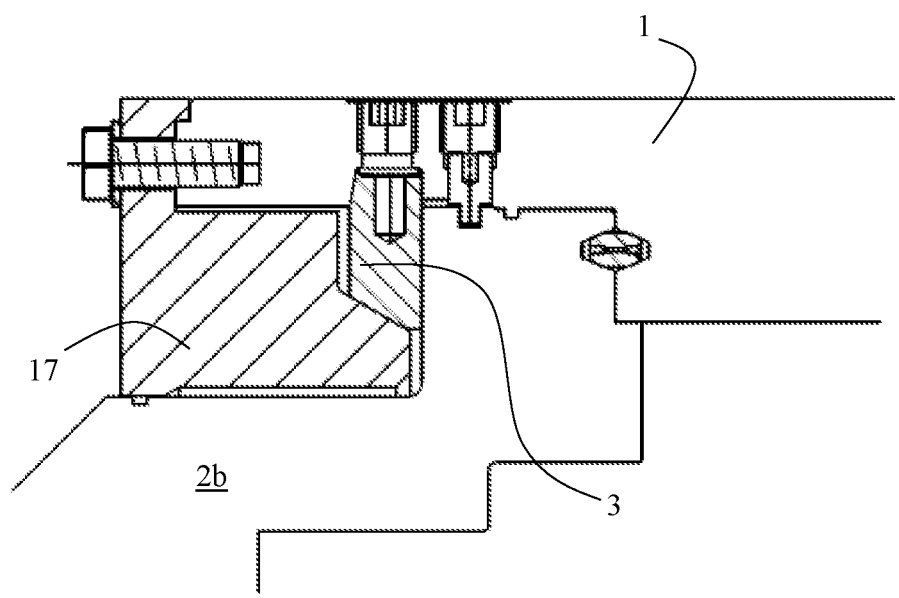
FIG. 15 is a detail sectional view showing how the single stop blocks the ring portions.

Referring to FIGS. 14 and 15, it can be seen that in a fourth embodiment of the valve, similar to the second embodiment, there is a single stop 17 to be fixed to the hollow body 1 around the secondary body 2 to lock the ring 3. Also in this case, as in the previous embodiment, the stop 17 has an arched shape to be arranged astride the adjacent arcs 3*a*-3*d*, in this case to lock them all together. The stop 17 is fixed to the hollow body 1 by means of screws screwed into axial holes obtained in the stop 17. In the portion that abuts against the arcs that make up the ring 3, the stop 17 has a portion (which in FIG. 15 is the extreme portion at right) which has a cross section with a substantially right trapezoid shape, with the bases perpendicular to the main axis X, the minor base facing in the opposite direction to the end 1*a* of the hollow body 1 and the oblique side facing the ring 3, which includes an oblique side facing the stop 17, so that the ring 3 and the stop 17 form a shape coupling which prevents the stop 17 from moving towards the end 1*a* of the hollow body 1.

As in the previous embodiment, the secondary body 2 is inserted into the hollow body 1 through the opening of the end 1*a* until it comes into contact with the spacers 8, after which the arcs 3*a*, 3*b*, 3*c*, 3*d* are inserted into the annular groove 1*b* to form the ring 3. Each arch 3*a*, 3*b*, 3*c*, 3*d* is fixed in the annular groove 1*b* by means of the screw screwed into the respective threaded hole 14 before the next arch is inserted. When the last arc is positioned, the stop 17 is arranged around the secondary body 2 and is fixed to the hollow body 1 by means of screws.

Any variants or additions may be made by skilled persons to the embodiments described and illustrated herein remaining within the scope of the following claims. In particular, further embodiments may comprise the technical features of one of the following claims with the addition of one or more technical features described in the text or illustrated in the drawings, taken individually or in any reciprocal combination.

The invention claimed is:

1. A valve comprising a hollow body which extends along a main axis (X), wherein a secondary body is arranged at one end of the hollow body substantially coaxially with the main axis (X) and comprises an inner end portion with a collar that projects towards the inner surface of the hollow body, in which the hollow body comprises an annular groove in which a ring is arranged at least partially to prevent movement of the secondary body towards the end of the hollow body, in which the ring is divided into at least two arcs configured to be inserted individually inside the groove of the hollow body to form the ring, wherein one or more stops are arranged around the secondary body to lock the ring, characterized by the fact that said one or more stops have an arched shape to be arranged astride two and adjacent arcs of the ring and said one or more stops present a portion having a cross section with a substantially right trapezoid shape, the bases of the right trapezoid being perpendicular to the main axis (X) and the oblique side of the right trapezoid facing the ring, wherein the ring comprises an oblique side facing said one or more stops, so that the ring and said one or more stops form a shape coupling which prevents said one or more stops to move towards the end of the hollow body.

2. The valve according to claim 1, wherein the ring is divided into at least four arcs, each of which covers an angle of 60°-180°.

3. The valve according to claim 2 wherein the ring is divided into at least four arcs and each of which covers an angle of 80°-100°.

4. The valve according to claim 1, wherein a peripheral portion of the ring has substantially the same profile and substantially the same dimensions as the annular groove.

5. The valve according to claim 1, wherein the annular groove and/or the ring has/have a cross-section with a substantially right trapezoid shape, with the bases parallel to the main axis (X), the larger base facing the main axis (X) and the oblique side facing the end of the hollow body.

6. The valve according to claim 1, wherein the adjacent surfaces of at least two adjacent arcs of the ring are flat and parallel to the main axis (X).

7. The valve according to claim 6, wherein the adjacent surfaces of two pairs of adjacent arcs of the ring lie on the same plane (P1).

8. The valve according to claim 7, wherein said plane (P1) is parallel to a plane (P2) on which the adjacent surfaces of two other pairs of adjacent arcs lie or is perpendicular to the planes on which the adjacent surfaces of others two pairs of adjacent arcs lie.

9. The valve according to claim 8, wherein a shutter can move in the hollow body along and/or around an axis (Y) substantially perpendicular to the main axis (X) through a control stem which passes through a radial opening formed in the hollow body and provided with a sleeve in which the control stem is arranged.

10. The valve according to claim 9, wherein the sleeve has a collar arranged in the hollow body and is provided with an external thread on which a threaded ring locking the sleeve in the radial opening is screwed.

11. The valve according to claim 9, wherein a flange is arranged around the sleeve and is locked thereon by a threaded ring screwed onto an external thread of the sleeve or by means of a shape coupling between a shaped seat of the sleeve and a corresponding shaped portion of the flange.

12. The valve according to claim 1, wherein the hollow body is provided with one or more radial holes for screws that can be screwed into at least one threaded hole made in the ring and/or in the inner end portion of the secondary body.

13. The valve according to claim 12, further comprising a plurality of stops having an arched shape to be arranged astride two adjacent arcs of the ring and comprising at least two tongues configured to be arranged in as many seats obtained near the adjacent surfaces of these two adjacent arcs.

14. The valve according to claim 1, wherein two secondary bodies are arranged at two ends of the hollow body and are locked by rings arranged in annular grooves made in the hollow body.

* * * * *